US006117554A

United States Patent [19]
Shalaby et al.

[11] Patent Number: 6,117,554
[45] Date of Patent: Sep. 12, 2000

[54] MODULATED MOLECULARLY BONDED INHERENTLY CONDUCTIVE POLYMERS ON SUBSTRATES WITH CONJUGATED MULTIPLE LAMELLAE AND SHAPED ARTICLES THEREOF

[75] Inventors: Shalaby W. Shalaby, Anderson, S.C.; Jacqueline M. Allan, Bowie, Md.

[73] Assignee: Poly-Med, Inc., Anderson, S.C.

[21] Appl. No.: 08/862,945

[22] Filed: May 30, 1997

[51] Int. Cl.[7] .......................... B32B 31/06; B32B 15/04; B05D 3/00; B05D 3/04
[52] U.S. Cl. ..................... 428/420; 428/457; 428/461; 427/299; 427/302; 427/304; 427/333
[58] Field of Search .................................. 428/411.1, 419, 428/420, 457, 913, 461; 427/96, 299, 301, 302, 304, 333

[56] References Cited

U.S. PATENT DOCUMENTS

| | | | |
|---|---|---|---|
| 3,023,180 | 2/1962 | Canterino et al. | 260/27 |
| 3,069,372 | 12/1962 | Schroeder et al. | 260/27 |
| 3,097,194 | 7/1963 | Leonard, Jr. et al. | 260/88.2 |
| 3,220,989 | 11/1965 | Rolih et al. | 260/88.2 |
| 3,278,464 | 10/1966 | Boyer et al. | 260/2.5 |
| 4,189,369 | 2/1980 | Fang | 204/296 |
| 4,207,405 | 6/1980 | Masler, III et al. | 525/328 |
| 4,500,684 | 2/1985 | Tucker | 525/327.3 |
| 4,581,415 | 4/1986 | Boyle, Jr. et al. | 525/332.2 |
| 4,678,840 | 7/1987 | Fong et al. | 525/340 |
| 4,699,804 | 10/1987 | Miyata et al. | 437/176 |
| 4,774,262 | 9/1988 | Blanquet et al. | 521/31 |
| 4,814,423 | 3/1989 | Huang et al. | 528/230 |
| 4,879,135 | 11/1989 | Greco et al. | 427/2 |
| 4,966,934 | 10/1990 | Huang et al. | 524/315 |
| 5,030,508 | 7/1991 | Kuhn et al. | 428/253 |
| 5,061,294 | 10/1991 | Harmer et al. | 51/295 |
| 5,093,439 | 3/1992 | Epstein et al. | 525/540 |
| 5,126,017 | 6/1992 | Nakama et al. | 205/159 |
| 5,133,841 | 7/1992 | Higo et al. | 204/59 |
| 5,194,313 | 3/1993 | Hupe et al. | 428/137 |
| 5,225,495 | 7/1993 | Han et al. | 525/327.4 |
| 5,255,495 | 10/1993 | Han et al. | 525/327.4 |
| 5,286,414 | 2/1994 | Kampf et al. | 252/500 |
| 5,371,182 | 12/1994 | Galaj et al. | 528/422 |
| 5,491,198 | 2/1996 | Shalaby et al. | 525/340 |
| 5,498,761 | 3/1996 | Wessling et al. | 427/542 |
| 5,691,062 | 11/1997 | Shalaby et al. | 428/411.1 |
| 5,830,539 | 3/1998 | Yan et al. | 427/551 |
| 5,849,415 | 12/1998 | Shalaby et al. | 428/419 |

FOREIGN PATENT DOCUMENTS

| | | | |
|---|---|---|---|
| 7103583 | 1/1971 | Japan . | |
| 876045 | 8/1961 | United Kingdom | 525/342 |
| 907765 | 10/1962 | United Kingdom | 525/340 |

OTHER PUBLICATIONS

Alper, J., *Science*, 1989, vol. 246, pp. 208–210.
Baker, G.L., "Progress Toward Processable, Environmentally Stable Conducting Polymers," *Handbook of Conducting Polymers*, Terje A. Skotheim, ed., Marcel Dekker, Inc., NY, 1986, pp. 271–296.
Pfluger, P., et al., "Electronic Structure and Transport in the Organic 'Amorphous Semiconductor' Polypyrrole," *Handbook of Conducting Polymers*, 1986. pp. 1369–1381.
Street, G.B., "Polypyrrole from Powders to Plastics," *Handbook of Conducting Polymers*, 1986, pp. 265–291.
Friend, R.H., *Nature*, 1986, vol. 322, pp. 308–309.
Unsworth, J., et al., *J. of Intell. Mater. Syst. and Struct.*, 1992, vol. 3, pp. 380–395.
Emin, D., "Basic Issues of Electronic Transport in Insulating Polymers," *Handbook of Conducting Polymers*, 1986, pp. 915–936.
Fujitsuka, M., et al., *Synth. Met.*, 1992, vol. 53, pp. 1–10.
MacDiarmid, A.G., et al., *Mat. Res. Soc. Symp. Proc.*, 1990, vol. 173, pp. 283–291.
Baum, R., *C&EN*, Apr. 19, 1993, pp. 36–37.
Focke, W.W., et al., *J. Phys. Chem.*, 1987, vol. 91. pp. 5813–5818.
Huang, W., et al., *J. Chem. Soc., Faraday Trans. 1*, 1986, vol. 82, pp. 2385–2400.
Pouget, J.P., et al., *Synth. Met.*, 1992, vol. 51, pp. 95–101.
McManus, P.M., et al., *J. Phys. Chem.*, 1987, vol. 91, pp. 744–747.
DeSurville, R., et al., *Electrochimica Acta.*, 1968, vol. 13, pp. 1451–1458.
Kulkarni, V.G., "Intrinsically Conducting Polymers from Fundamental to Applied Research," *Intrinsically Conducting Polymers: An Emerging Technology*, M. Aldessi, ed., Kluwer Academic Publishers, Boston, 1993, pp. 45–50.
Chiang, J., et al., *Synth. Met.*, 1986, vol. 13, pp. 193–205.
MacDiarmid, A.G., et al., *Synth. Met.*, 1987, vol. 18, pp. 285–290.
Diaz, A.F., et al., *J. Electroanal. Chem.*, 1980, vol. 111, pp. 111–114.
Kobayashi, T., et al., *J. Electroanal. Chem.*, 1984, vol. 161, pp. 419–423.

(List continued on next page.)

*Primary Examiner*—Paul Thibodeau
*Assistant Examiner*—Sheeba Ahmed
*Attorney, Agent, or Firm*—Leigh P. Gregory

[57] ABSTRACT

Organic inherently conductive polymers, such as those based on polyaniline, polypyrrole and polythiophene, are sequentially formed in-situ onto polymeric surfaces that are chemically functionalized to molecularly bond the conductive polymers to the substrates. The polymeric substrate is preferably a preshaped or preformed thermoplastic film, fabric, or tube, although other forms of thermoplastic and thermoset polymers can be used as the substrates for functionalization using, most preferably, phosphonylation-based processes followed by exposure to an oxidatively polymerizable compound capable of forming an electrically conductive polymer. It has been found that the degree of electrical conductivity may be modulated by bonding further electrically conductive layers to the article. That is, each underlying conductive layer is functionalized prior to bonding of a subsequent conductive layer thereto until the degree of conductivity is achieved. In an alternative embodiment, metals such as gold or platinum may be bonded to one of the functionalized surfaces.

20 Claims, No Drawings

OTHER PUBLICATIONS

Pouget, J.P., et al., *Macromolecules,* 1991, vol. 24, pp. 779–789.

MacDiarmid, A.G., et al., *Mol. Cryst. Liq. Cryst.,* 1985, vol. 121, pp. 173–180.

Teasdale, P.R., et al., *Analyst,* 1993, vol. 118, pp. 329–334.

Kanazawa, K.K., et al., *Synth. Met.,* 1979, vol. 1, pp. 329–336.

Kanazawa, K.K., et al., *J.C.S. Chem. Comm.,* 1979, pp. 854–855.

Diaz, A.F., et al., *J.C.S. Chem. Comm.,* 1979, pp. 635–636.

Mohilner, D.M., et al., *J. Am. Chem. Soc.,* 1962, vol. 84, pp. 3618–3622.

Orata, D., et al., *J. Am. Chem. Soc.,* 1987, vol. 109, pp. 3574–3581.

Yassar, A., et al., *Polym. Commun.,* 1987, vol. 28, pp. 103–104.

Buckley, L., et al., *Internat. SAMPE Electron. Conf.,* 1987, vol. 1, pp. 286–293.

Dao, L.H., et al., *ANTEC,* 1991, pp. 861–863.

Niwa, O., et al., *Polymer J.,* 1987, vol. 19, No. 11, pp. 1293–1301.

Pron, A., et al., *Synth. Met.,* 1987, vol. 18, pp. 49–52.

Gregory, R.V., et al., *Synth. Met.,* 1989, vol. 28., pp. C823–C835.

Kuhn, H.H., "Characterization and Application of Polypyrrole–Coated Textiles," *Intrinsically Conducting Polymers: An Emerging Technology,* 1993, pp. 25–34.

Chan, H.S.O., et al., *Synth. Met.,* 1990, vol. 35, pp. 333–344.

Cai, Z., et al., *J. Am. Chem. Soc.,* 1989, vol. 111, pp. 4138–4139.

Lei, J., et al., *Synth. Met.,* 1992, vol. 47, pp. 351–359.

Tzou, K., et al., "Mechanically Strong, Flexible Highly Conducting Polyaniline Structures Formed From Polyaniline Gels."

MODULATED MOLECULARLY BONDED INHERENTLY CONDUCTIVE POLYMERS ON SUBSTRATES WITH CONJUGATED MULTIPLE LAMELLAE AND SHAPED ARTICLES THEREOF

FIELD OF THE INVENTION

The present invention relates to polymeric articles with multilamellar conductive surfaces comprising molecularly bound inherently conductive polymers and methods for in-situ formation of such surfaces in more than one sequence. More specifically, this invention relates to articles whose surfaces are made conductive by the in-situ formation of inherently conductive polymers such as those based on polyaniline, polypyrrole, and polythiophene, in the presence of chemically activated polymeric substrates produced through processes such as those based on phosphonylation. Most specifically, this invention deals with preformed thermoplastic and thermoset polymeric articles capable of displaying modulated levels of surface conductivity, barrier properties to microwave and similar radiation, changing conductivity in the presence of oxidizing by-products of contacting biologic environments, and exhibiting no adverse effect to viable cells such as fibroblasts. Also within the scope of the present invention are polymeric articles with conductive surfaces comprising metals such as gold, platinum, and copper among others.

BACKGROUND OF THE INVENTION

Conventionally, materials are classified as metals, semiconductors, or insulators according to their ability to conduct electricity. In a material, electrons are organized in discrete energy levels or bands separated by a distinct amount of energy. According to band theory, if the highest filled band is only partly full, the empty states will assist conduction. The energy required to promote an electron from one energy band to the next higher band is called the band gap energy. Its magnitude determines whether such a material is a metal, semiconductor, or insulator. The energy level at the midpoint between the two bands is termed the Fermi level.

In metals the partially filled upper band is referred to as the conduction band. Addition of small amounts of energy excites electrons in this level quite easily. These easily excited electrons are responsible for the electrically conducting nature of metals. For a semiconductor, the valence band is completely filled, and the conduction band is completely empty. Therefore, exciting an electron requires the addition of energy equal to that of the band gap energy, approximately 1 eV at room temperature. Similarly, insulators have a completely filled valence band and a completely empty conduction band. However, the band gap energy required to move an electron into the unfilled conduction band is much greater than that of a semiconductor, on the order of 15 eV. Insulators, therefore, do not conduct electricity except under the application of rather large voltages.

Although most polymers are insulators, a class of inherently conductive polymers (ICPs) exists that cannot be classified in any of the above categories. Through oxidation and reduction reactions, ICPs are doped to electrically conductive states. The radical cations and radical anions formed in these reactions are accompanied by a distortion or relaxation of the polymer lattice which acts to minimize the local strain energy. The energy level associated with these distortions is split from the continuum of band states and symmetrically positioned about the Fermi level.

ICPs can be divided into two groups, those possessing degenerate ground states and those without degenerate ground states. ICPs with degenerate ground states, e.g. polyacetylenes, do not have a determined sense of bond alternation. In these materials, the transposition of single and double bonds yields energetically equivalent structures. Most ICPs, such as poly(p-phenylene), are non-degenerate. In these materials, the transposition of single and double bonds leads to the formation of quinoid structures of significantly higher energy than the parent aromatic forms.

The level of conductivity achieved in ICPs depends on the molecular structure of the polymer backbone, the degree of doping, and the nature of the counter ion species incorporated. Conductive polymers display an impressive range of electrical conductivity produced by controlled doping. The considerably larger conductivity range in ICPs compared to semiconductor crystals results from the intrinsic difference in their structures. Because of their rigid, three dimensional lattice structure, inorganic semiconductors can only accept dopant ions at low concentrations and therefore have a limited conductivity range. ICPs, on the other hand, consist of an assembly of pseudo-one-dimensional conjugate chains. They are able to accept far more dopant ions, thereby achieving a greater range of conductivity.

Pyrrole is polymerized by an oxidative process. Polypyrrole can be prepared either chemically through solution processing or electrochemically through polymer deposition at an electrode. Both processes involve electron transfer. The polymerization proceeds via the radical cation of the monomer which reacts with a second radical cation to give a dimer by elimination of two protons. Dimers and higher oligomers are also oxidized and react further with the radical cations to build up the polypyrrole chain. The polymer is thus formed by eliminating two hydrogens from each pyrrole unit and linking the pyrroles together via the carbons from which the hydrogens were eliminated.

Pyrrole is readily polymerized by a wide variety of oxidizing agents in aqueous solution. Polypyrrole can also be prepared electrochemically. Typically, polypyrrole films are galvanostatically deposited on a platinum electrode surface using a one-compartment cell containing an aqueous solution of pyrrole and an oxidizing agent.

Although polypyrrole is prepared in its oxidized conducting state, the resulting polymer can be subsequently reduced to give the neutral, highly insulating form. Electrochemical switching between the conducting and insulating state is accompanied by a color change from blue-black to yellow-green and a conductivity change which spans about ten orders of magnitude. As with polyaniline, switching between conducting and insulating states is a reversible process.

Conductive polymers have traditionally been plagued by problems of stability, narrowly defined here as the maintenance of conductivity. In the process of oxidative doping, ICPs are stripped of a fraction of their electrons, thereby increasing their conductivity by several orders of magnitude. While the gaps left by the lost electrons provide a pathway for charge to be conducted down the polymer chain, they also make the polymer highly reactive with oxygen and water. Stabilization, then, becomes an effort to minimize doping site loss by chemical degradation or doping site quenching by such contaminants as oxygen or water. Various methods have proven effective in stabilizing ICPs; among these are encapsulation techniques and the use of barrier resins and sacrificial layers.

Compared to other conjugated polymers, polyaniline and polypyrrole have an unusually good chemical stability and encounter only a mineral loss of conductivity upon exposure to ambient environments. For example, it has been found that the conductivity of emeraldine hydrochloride formed by the protonation of emeraldine base did not change during extended periods in laboratory air. Similarly, the electrical properties of polypyrrole are indefinitely stable in air at room temperature.

Because ICPs form rigid, tightly packed chains, they are generally resistant to processing, a problem which has limited their widespread commercial use. While tight chain packing is essential for interchain charge hopping, it also prevents the polymer from intermixing with solvent molecules. Therefore, as a whole, ICPs tend to form as intractable masses. Many approaches to synthesizing tractable ICPs have been explored including substituted derivatives, copolymers, polyblends, colloidal dispersions, coated latexes, and ICP composites. These efforts have yielded a rich variety of blends, random copolymers, and graft and block copolymers with enhanced processability.

For many years, researchers have strived to prepare smooth, coherent films of polyaniline and polypyrrole. In 1968, cohesive polypyrrole films were electrochemically prepared at an electrode surface. The electrochemical preparation of free standing polyaniline films with a fairly smooth, featureless topography was accomplished in the early eighties. Unfortunately, ICPs formed by electrochemical polymerization are generally insoluble and brittle.

In an effort to produce conductive polymer films with improved mechanical properties, researchers have attempted to synthesize ICPs on polymeric supports. Because such supports are normally electrical insulators, the standard electrochemical methods of deposition are difficult to apply. Most research, therefore, has centered on the chemical polymerization of ICPs on suitable substrates.

For example, polypyrrole films have been formed on the surface of a polyvinyl alcohol-ferric chloride ($PVA-FeCl_3$) complex. An aqueous solution containing a mixture of polyvinyl alcohol and ferric chloride was deposited on a polyester support and allowed to evaporate. The $PVA-FeCl_3$ was then suspended over a solution of pyrrole in ethanol. Under these conditions, polymerization of pyrrole occurred on the $PVA-FeCl_3$ surface to produce a highly conducting, flexible laminate.

Also, pyrrole has been electrochemically polymerized onto an electrode covered with vinylidene fluoride-trifluoroethylene copolymer (P(VDF-TrFE)). Electrochemical polymerization of pyrrole was carried out in a one compartment cell containing an electrode covered with the copolymer. Polypyrrole was incorporated into the P(VDF-TrFE) film by beginning at the electrode surface and continuing through to the film surface. This process resulted in very flexible and stretchable conducting films.

A method has been devised to coat textiles with a uniform layer of electrically conducting polymer via an absorption process. Polyaniline and polypyrrole are solution-polymerized onto nylon and polyethylene terephthalate fabrics. Examination of the fabrics indicates that each individual fiber is encased with a smooth, coherent layer of the ICP.

Similarly, a method has been developed for making an electrically conductive textile material which is a textile material made predominantly of fibers selected from polyester, polyaniline, acrylic, polybenzimidazole, glass and ceramic fibers, wherein the textile material is covered to a uniform thickness of from about 0.05 to about 2 microns through chemical oxidation in an aqueous solution with a coherent, ordered film of an electrically conductive, organic polymer selected from a pyrrole polymer and an aniline polymer. Examination of such materials indicates that each individual fiber is encased or enveloped with a smooth, coherent layer of the ICP.

Ultra-thin films of emeraldine hydrochloride have been formed on poly(methyl methacrylate) (PMMA) and polystyrene (PS) substrates. The laminate films are formed by the oxidative polymerization of aniline at the interface between a lower oxidizing aqueous solution and an immiscible solution of the polymer and aniline monomer in chloroform. Volatilization of the chloroform yields a free-standing laminate film of the desired polymer substrate coated on one side with a continuous layer of emeraldine hydrochloride. These laminate films possess the mechanical properties of the substrate and exhibit conductivities in the region of 10 S/cm.

ICPs have been polymerized in the pores of microporous support membranes, yielding thin, conductive films on the membrane surface. In one process, a microporous membrane is used to separate solution of a heterocyclic monomer from a solution of a chemical oxidizing agent. As the monomer and oxidizing agent diffuse toward each other through the pores in the membrane, they react to yield conducting polymers. The result is an ultrathin film, electrically conducting composite polymer membrane.

An interfacial polymerization method has been developed in which the pores of a microporous support membrane are filled with an oxidative polymerization reagent. The membrane-confined solution is exposed to a vapor phase containing a monomer which can be oxidatively polymerized to yield a conductive polymer. A thin, defect-free film of the conductive polymer grows across the surface of the microporous support membrane.

Recently, strong and highly conductive films up to 0.6 mm thick have been formed from polyaniline gels. These gels are prepared from emeraldine base solutions in N-methyl-2-pyrrolidinone. The films are doped with a variety of doping agents. In terms of conductivity, mechanical properties, and thermal stability, methane sulfonic acid and ethane sulfonic acid dopants yield the best films.

Concerns about limited conductivity and constraints associated with efforts to increase conductivity through increased thickness have been addressed by earlier investigators. However, attempts to increase conductivity through mere increase in thickness of the conductive layer has been associated with poor abrasion resistance of the conductive layer, a tendency to undergo shear-induced delamination, and non-uniformity.

Surface phosphonylation has been achieved through a modified Arbuzov reaction using two approaches by Shalaby et al. in U.S. Pat. Nos. 5,491,198 and 5,558,517. In one approach gas phase phosphonylation is used to create acid-forming functional groups on surfaces in two steps. The first step entails chlorophosphonylation of a hydrocarbon moiety via the reaction of phosphorus trichloride ($PCl_3$) and oxygen, which yields the corresponding phosphonic dichlorides. The phosphonyl dichlorides are subsequently hydrolyzed to phosphonic acid.

In the second approach, a liquid phase method for the surface phosphonylation of preformed thermoplastic polymers has been developed. The polymer is placed in a solution of 10% (v/v) $PCl_3$ in carbon tetrachloride which is bubbled with oxygen. Additionally, a gas phase process for surface phosphonylation has been developed. In this method, the polymer is suspended in a flask containing several drops of $PCl_3$ and oxygen gas. In each method, the polymer is quenched in water after allowing the reaction ample time to reach completion. Characterization of the polymers treated by each method indicates the presence of reactive phosphonate groups on their surface and no change in the bulk material properties.

Organic ICPs have been formed in-situ onto polymeric surfaces that have been chemically activated, such as by the phosphonylation processes described above, such that the ICPs are molecularly bonded to the substrate, as is described in U.S. Pat. No. 5,691,062 and U.S. Pat. No. 5,849,415, both of which are incorporated herein by reference. However, no precise means was taught for modulating the degree of electrical conductivity of the ultimate product.

SUMMARY OF THE INVENTION

It is an advantage of the present invention that an article having modulated electrical conductivity is provided.

In one aspect, the present invention is directed to providing a method for imparting a modulated degree of electrical conductivity to an article which includes the steps of: molecularly bonding an initial conductive polymer layer to the surface of the article by the steps of: functionalizing the surface of the article to produce a chemically interactive surface having acid-forming functional groups thereon, each of the functional groups having a multivalent central atom, and contacting the functionalized surface with a solution of an oxidatively polymerizable compound, selected from a pyrrole compound, an aniline compound and a thiophene compound, whereby an electrically conductive polymer is formed, molecularly bonding a second conductive polymer layer to the surface of the initial conductive polymer layer, and optionally molecularly bonding at least one further conductive polymer layer to the article in order to achieve a desired degree of electrical conductivity, whereby the steps of molecularly bonding a subsequent conductive polymer layer to an underlying conductive polymer layer include the steps of: functionalizing the surface of the underlying conductive polymer layer to produce a chemically interactive surface having acid-forming functional groups thereon, each of the functional groups having a multivalent central atom, and contacting the subsequent functionalized surface with a solution of an oxidatively polymerizable compound, selected from a pyrrole compound, an aniline compound and a thiophene polymer.

In another aspect of the present invention is directed to providing a method for imparting a modulated degree of electrical conductivity to an article which includes the steps of: molecularly bonding a layer of a conductive material to the surface of the article by the steps of: functionalizing the surface of the article to produce a chemically interactive surface having acid-forming functional groups thereon, each of the functional groups having a multivalent central atom, and depositing the electrically conductive material onto the functionalized surface, molecularly bonding a second layer of conductive material to the first layer of conductive material, and optionally molecularly bonding at least one further layer of conductive material to the article in order to achieve a desired degree of electrical conductivity, whereby the steps of molecularly bonding a subsequent layer of conductive material to an underlying layer of conductive material comprise the steps of: functionalizing the surface of the underlying conductive layer to produce a chemically interactive surface having acid-forming functional groups thereon, each of the functional groups having a multivalent central atom, and depositing an electrically conductive material onto the functionalized surface.

In yet another aspect the present invention is directed to providing an electrically conductive article which includes a polymeric substrate having acid-forming functional groups covalently bonded thereto, and an initial layer of an electrically conductive material, wherein the layer of conductive material is molecularly bonded to a second outer surface thereof, and a subsequent coherent, uniform layer of an electrically conductive material, wherein the subsequent layer of conductive material is molecularly bonded to the acid-forming functional groups on the second outer surface of the initial layer.

DETAILED DESCRIPTION OF THE INVENTION

The present invention is directed to the formation of two or more layers of a conductive polymer onto the surface of a polymeric substrate. The first conductive polymer layer is molecularly bound to the outer surface of the substrate and each of the subsequent conductive polymer layers are molecularly bound to the underlying ICP layer. Such bonding provides for a coherent lamellar outermost conductive layer which is strongly adhered to the article and allows the article to have any of a variety of forms and sizes. The degree of conductivity of the final article is determined by the number of conductive polymer layers or lamellae which are formed onto the underlying substrate in accordance with the present invention.

Within the scope of the present invention are, for example, films, fibers, textile materials, molded articles, and microcellular foams formed from polymers such as polyolefins, polyamides, polyesters, polyurethanes, poly-ether-ketones, polystyrene, and members of the vinyl, acrylic fully aromatic, or highly conjugated families of polymers and copolymers thereof, as well as articles formed from polymeric composites or carbon fibers. Of particular interest are polyelectrolytic substrates having carboxylic, sulfonic and/or phosphonic acid moieties such as those formed of polyethylene, alkyl- or acyl-substituted aromatic polyesters, poly-ether-ether-ketones, polysulfones, polyimides, as well as similarly substituted polybenzimidazoles.

Articles produced in accordance with the present invention are suitable and appropriate for a variety of end use applications where conductivity may be desired including, for example, antistatic garments, antistatic floor coverings, components in computers, and generally, as replacements for metallic conductors, or semiconductors, including such specific applications, as, for example, batteries, fuel cells, photovoltaics, electostatic dissipation and electromagnetic shielding, for example, as antistatic wrappings of electronic equipment or electromagnetic interference shields for computers and other sensitive instruments, including aerospace applications and biomedical devices. A preferred end use for the present invention includes medical applications such as surgical and diagnostic devices and instruments, or components thereof, conductive polymeric wires or leads for activation of biological processes, and antistatic clothing for use by operating room personnel. Further applications include coatings for controlled heat transfer.

Broadly, the method of the present invention is directed to a surface functionalizing step which renders the outer surface of the polymeric article reactive by providing acid-forming functional groups with each group having a multivalent central atom followed by a polymerization step whereby a precursor monomer of a conductive polymer is polymerized directly onto the reactive surface. In addition to providing for molecular bonding of the conductive polymer to the article's surface, the functional groups act, as least in part, as both a doping agent and an oxidizing agent to aid in polymerization. A second conductive polymer layer is similarly formed onto the initial conductive polymer layer. That is, the initial conductive polymer layer is then subjected to the above-mentioned surface functionalizing step whereby acid-forming functional groups are bonded to that initial layer; a precursor monomer of a conductive polymer is then polymerized directly onto that reactive surface. The second conductive polymer layer may be identical to or different from the initial conductive polymer layer. Subsequent conductive polymer layers are formed onto underlying layers in the same way.

A preferred means for bonding acid-forming functional groups to the underlying substrate and to the relevant conductive polymer layers is disclosed in U.S. Pat. No. 5,491,198 entitled "Process For Phosphonylating the Surface of an Organic Polymeric Preform," and U.S. Pat. No. 5,558,517 entitled "Polymeric Prosthesis Having a Phosphonylated Surface," both of which are incorporated herein by reference. Generally, the two patents are directed to a process for producing a phosphonylated surface on an organic polymer with available reactive —CH— moieties and application of the process to the production of preshaped articles. Although phosphonylation is a preferred means for achieving the surface functionalizing step of the present method, other reactions which produce acid-forming functional groups having multivalent central atoms, such as, for example, sulfonylation, may also be employed.

In one embodiment of the present invention, prior to functionalization the substrate may be alkylated or acylated to make available reactive —CH— bearing side-groups on the polymeric main chain. Such preliminary surface alkylation or acylation may be particularly advantageous for pretreating an underlying conductive polymer layer prior to functionalizing and bonding a subsequent conductive polymer layer thereto. A preferred means for such preliminary treatment of a conductive polymer layer prior to functionalization is to alkylate or acylate the precursor monomer prior to polymerization onto the underlying surface. Preliminary surface alkylation or acylation also may be employed in order to increase the availability of reactive groups for a substrate which is either fully aromatic or highly conjugated.

Doping agents are generally strong acids such as p-toluenesulfonic acid, naphthalene disulfonic acid, methane sulfonic acid, chloromethyl sulfonic acid, fluoromethyl sulfonic acid, oxalic acid, sulfosalicylic acid and trifluoroacetic acid. However, the acid moieties of the functional groups formed on the surface during functionalization may also serve as dopants, either alone or in combination with an externally supplied doping agent. Similarly, oxidizing agents such as ammonium peroxydisulfate, ferric chloride, salts of permanganates, peracetates, chromates and dichromates may be employed, although the multivalent central atom of the functional groups on the article's chemically interactive surface may also serve as an oxidizing agent, either alone or in combination with an externally supplied oxidizing agent.

Electrically conductive articles formed in accordance with the present invention preferably include an outer layer of an inherently conductive polymer which is bonded to the preshaped substrate. As compared to electrically conductive textile fibers of the prior art which had, essentially, an outer shell of a conductive polymer enveloping or encasing each underlying fiber substrate, the present outer ICP layer is believed to be molecularly bonded to the underlying ICP layers which are ultimately molecularly bonded to the underlying substrate. Such bonding scheme is verified by the retention of electrical conductivity following a period of agitation, such as sonication.

Most generally the present invention is directed to surface functionalization by phosphonylation or an equivalent means for imparting appropriate reactivity to a polymeric article's surface, followed by deposition of a conductive material onto the surface, followed by subsequent functionalization and deposition steps until a desired level of conductivity is achieved. Although, in preferred embodiments, the deposition steps involve the formation of an inherently conductive polymer onto the pretreated surface, in alternative embodiments other conducting materials may be deposited onto the pretreated surfaces by other methods. For example, metals such as gold, platinum, chromium, copper, silver, cobalt, and titanium may be deposited as the outermost layer by any of a variety of methods including sputtering, vapor phase deposition, and electrochemical deposition, among others.

Another optional embodiment provides for the incorporation of multi-valent metal ions into the functionalized surface underlying the outermost conductive layer in order to increase overall conductivity.

Yet a further optional embodiment provides for the use of a direct electric current in aiding polymerization of the electrically conductive polymer either onto the underlying substrate or an underlying conductive polymer layer.

For the following Examples, resistance was measured using a multimeter with probes placed at a measured distance using silver painted leads.

EXAMPLE 1

A low density polyethylene (LDPE) film was pressed on a Carver laboratory press. Teflon covered stainless steel plates were cleaned with acetone, and 8 g. LDPE beads were scattered evenly on one of the plates within an 8×12 cm$^2$ frame. The second plate was put on top of the assembly. The LDPE was compression molded at 180° C. under 11 metric tons over a 15.2×15.2 cm$^2$ area.

The film was suspended in a 2 L reaction kettle which contained a magnetic stir bar. The glassware was flamed dried under vacuum to insure the system was dry. Once cooled to room temperature, the kettle was purged with oxygen and 1 ml PCl$_3$ was added to the bottom of the kettle, taking care not to drip any on the suspended film. The gas was mixed with the magnetic stir bar for four hours on a magnetic stir plate. After phosphonylation, the functionalized film was sonicated in deionized water for one hour, rinsed twice with fresh deionized water, and air dried.

Polypyrrole was deposited on the phosphonylated film using an in situ polymerization technique. The film was immersed in a solution containing 70 ml 0.02 M pyrrole in water, 30 ml 0.1 M naphthalene disulfonic acid in water, 10 ml 0.1 M sulfosalicylic acid in water, 1.36 ml 60%(w/v) FeCl$_3$ in water, and 140 ml water. The solution was agitated occasionally over a 19 hour period. The film was then removed from the solution, sonicated in deionized water for 30 min., rinsed twice in fresh deionized water, and dried in a vacuum oven at 37° C.

The surface conductive polyethylene film was functionalized by treatment for four hours under the same phosphonylation conditions described above. Polypyrrole was deposited onto the phosphonylated surface, also as described above.

The resistance of the film following the application of each of the first and then the second conductive polymer layers was measured using a digital multimeter. The multimeter probes were positioned at film corners diagonally across from each other. The measured resistance following the deposition of the first conductive polymer layer onto the phosphonylated LDPE was 0.020±0.001 R/d (kΩ/mm). Following the deposition of the second conductive layer onto the phosphonylated first conductive polymer layer the resistance dropped to 0.012±0.001 R/d (kΩ/mm).

EXAMPLE 2

Four lamellae of polypyrrole were bonded to a low density polyethylene substrate sequentially, substantially as described above in Example 1. Phosphonylation was employed as the surface functionalizing step both for pretreatment of the low density polyethylene substrate and for functionalizing of the intermediate polypyrrole layers. Resistance measurements were taken following the deposition of each of the polypyrrole layers onto the substrate and following the phosphonylation of the first, second, and third polypyrrole layers. The resistance data is set forth in Table I, below.

TABLE I

| Sample No. | Sample Description | Resistance/distance KΩ/mm |
| --- | --- | --- |
| 1 | 1 layer PPy on LDPE | 0.14 ± 0.01 |
| 2 | Phosphonylated No. 1 | 0.16 ± 0.02 |
| 3 | 2 layers PPy on LDPE | 0.08 ± 0.02 |
| 4 | Phosphonylated No. 3 | 0.10 ± 0.01 |
| 5 | 3 layers PPy on LDPE | 0.06 ± 0.01 |
| 6 | Phosphonylated No. 5 | 0.07 ± 0.01 |
| 7 | 4 layers PPy on LDPE | 0.04 ± 0.01 |

EXAMPLE 3

Four lamellae of polypyrrole were bonded to a polypropylene substrate substantially as described above in Example 1. Phosphonylation was employed as the surface functionalizing step both for pretreatment of the PP substrate and for functionalizing the intermediate polypyrrole layers. Resistance measurements were taken following the deposition of each of the polypyrrole layers onto the substrate and following the phosphonylation of the first, second, and third polypyrrole layers. The resistance data is set forth in Table II, below.

TABLE II

| Sample No. | Sample Description | Resistance/distance KΩ/mm |
| --- | --- | --- |
| 1 | 1 layer PPy on PP | 0.18 ± 0.03 |
| 2 | Phosphonylated No. 1 | 0.19 ± 0.02 |
| 3 | 2 layers PPy on PP | 0.09 ± 0.01 |
| 4 | Phosphonylated No. 3 | 0.10 ± 0.01 |
| 5 | 3 layers PPy on PP | 0.06 ± 0.01 |
| 6 | Phosphonylated No. 5 | 0.06 ± 0.01 |
| 7 | 4 layers PPy on PP | 0.04 ± 0.00 |

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for imparting a modulated degree of electrical conductivity to an article comprising the steps of:
   molecularly bonding an initial conductive polymer layer to the surface of the article by the steps of:
   a) functionalizing the surface of the article to produce a chemically interactive surface having acid-forming functional groups thereon, each of said functional groups having a multivalent central atom; and
   b) contacting the functionalized surface with a solution of an oxidatively polymerizable compound, selected from the group consisting of a pyrrole compound, an aniline compound and a thiophene compound, whereby an electrically conductive polymer is formed;
   molecularly bonding a second conductive polymer layer to the surface of the initial conductive polymer layer; and
   optionally molecularly bonding at least one further conductive polymer layer to the article in order to achieve a desired degree of electrical conductivity;
   whereby the steps of molecularly bonding a subsequent conductive polymer layer to an underlying conductive polymer layer comprise the steps of
   a) functionalizing the surface of the underlying conductive polymer layer to produce a chemically interactive surface having acid-forming functional groups thereon, each of said functional groups having a multivalent central atom; and
   b) contacting the subsequent functionalized surface with a solution of an oxidatively polymerizable compound, selected from the group consisting of a pyrrole compound, an aniline compound and a thiophene compound.

2. The method set forth in claim 1 wherein the steps of functionalizing the surface of the article and functionalizing the surface of the conductive layer comprise:
   contacting the surface of the article with a solution of a solvent and a halide of a multivalent atom, said solvent being chosen from the group consisting of solvents in which the organic article is insoluble and in which the halide is soluble but nonreactive therewith; and
   oxygenating said surface to produce said pretreated surface having acid-forming functional groups thereon, each of said functional group having a multivalent central atom.

3. The method set forth in claim 1 wherein the steps of functionalizing the surface of the article and functionalizing the surface of each conductive layer comprise contacting the surface of the article with oxygen and phosphorus trichloride vapors.

4. The method set forth in claim 3 wherein the multivalent atom is phosphorus.

5. The method set forth in claim 1 wherein the multivalent atom is sulfur.

6. The method set forth in claim 1 further including alkylating the surface of the article prior to functionalization.

7. The method set forth in claim 1 further including acylating the surface of the article prior to functionalization.

8. The method set forth in claim 1 further including alkylating the surface of the underlying conductive polymer layer prior to functionalization.

9. The method set forth in claim 8 wherein the step of alkylating the surface of the underlying conductive polymer layer comprises alkylating the precursor monomer of said conductive polymer prior to polymerization.

10. The method set forth in claim 1 further including acylating the surface of the underlying conductive polymer layer prior to functionalization.

11. The method set forth in claim 10 wherein the step of acylating the surface of the underlying conductive polymer layer comprises acylating the precursor monomer of said conductive polymer prior to polymerization.

12. The method set forth in claim 1 wherein at least one of said steps of contacting the subsequent functionalized surface with an oxidatively polymerizable compound further includes providing an electric current thereby enhancing polymerization.

13. A method for imparting a modulated degree of electrical conductivity to an article comprising the steps of:
  molecularly bonding a layer of a conductive polymer to the surface of the article by the steps of:
    a) functionalizing the surface of the article to produce a chemically interactive surface having acid-forming functional groups thereon, each of said functional groups having a multivalent central atom; and
    b) depositing the conductive polymer onto the functionalized surface
  molecularly bonding a second layer of conductive material to the first layer of conductive polymer; and
  optionally molecularly bonding at least one further layer of conductive material to the article in order to achieve a desired degree of electrical conductivity;
  whereby the steps of molecularly bonding a subsequent layer of conductive material to an underlying layer of conductive polymer comprise the steps of
    a) functionalizing the surface of the underlying conductive polymer layer to produce a chemically interactive surface having acid-forming functional groups thereon, each of said functional groups having a multivalent central atom; and
    b) depositing a conductive material onto the functionalized surface;
  such that upon achieving the desired degree of electrical conductivity the article comprises a plurality of conductive layers comprising at least one underlying conductive layer and an outermost conductive layer, wherein each underlying conductive layer comprises a conductive polymer.

14. The method set forth in claim 13 wherein the outermost layer comprises a metal.

15. The method set forth in claim 14 wherein the metal is gold.

16. The method set forth in claim 13 wherein the outermost layer comprises an organic polymer.

17. An electrically conductive article comprising:
  a polymeric substrate having acid-forming functional groups covalently bonded thereto; and
  an initial layer of an electrically conductive polymer, wherein said layer of conductive polymer is molecularly bonded to said acid-forming functional groups at a first outer surface thereof and wherein said initial layer of conductive polymer further comprises acid-forming functional groups covalently bonded to a second outer surface thereof; and
  a subsequent coherent, uniform layer of an electrically conductive material, wherein said subsequent layer of conductive material is molecularly bonded to said acid-forming functional groups on said second outer surface of said initial layer;
  wherein the article comprises a plurality of electrically conductivity layers comprising at least one underlying electrically conductive polymer layer and an outermost electrically conductive layer.

18. The article set forth in claim 17 wherein the outermost layer comprises a metal.

19. The article set forth in claim 17 wherein the subsequent layer of an electrically conductive material comprises an electrically conductive organic polymer selected from the group consisting of a pyrrole polymer, an aniline polymer, and a thiophene polymer.

20. The article set forth in claim 19 further including at least one further, subsequent layer of an electrically conductive material bonded thereto.

* * * * *